United States Patent
Sickart et al.

(10) Patent No.: US 10,358,145 B2
(45) Date of Patent: Jul. 23, 2019

(54) ACTUATING DEVICE

(71) Applicant: Dr. Ing. h.c. F. Porsche Aktiengesellschaft, Stuttgart (DE)

(72) Inventors: Michael Sickart, Heimsheim (DE); Arne Krüger, Karlsruhe (DE); Gerd Bofinger, Vaihingen Enz (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/711,309

(22) Filed: Sep. 21, 2017

(65) Prior Publication Data
US 2018/0079428 A1    Mar. 22, 2018

(30) Foreign Application Priority Data
Sep. 22, 2016   (DE) .................. 10 2016 117 896

(51) Int. Cl.
| | |
|---|---|
| *B60W 50/14* | (2012.01) |
| *F16H 61/02* | (2006.01) |
| *F16H 61/16* | (2006.01) |
| *F16H 61/24* | (2006.01) |

(52) U.S. Cl.
CPC ......... *B60W 50/14* (2013.01); *F16H 61/0204* (2013.01); *F16H 61/16* (2013.01); *F16H 61/24* (2013.01); *F16H 2061/163* (2013.01); *F16H 2061/248* (2013.01)

(58) Field of Classification Search
None
See application file for complete search history.

(56) References Cited

U.S. PATENT DOCUMENTS

| | | | |
|---|---|---|---|
| 5,545,108 A | 8/1996 | Wagner et al. | |
| 7,104,152 B2 * | 9/2006 | Levin | F16H 59/044 200/61.88 |

(Continued)

FOREIGN PATENT DOCUMENTS

| | | |
|---|---|---|
| CN | 1144171 A | 3/1997 |
| DE | 1420930 A1 | 12/1995 |

(Continued)

OTHER PUBLICATIONS

German Search Report with partial English translation for German Application No. 10 2016 117 896.9, dated May 29, 2017, 8 pages.

*Primary Examiner* — Dirk Wright
(74) *Attorney, Agent, or Firm* — RatnerPrestia

(57) ABSTRACT

An actuating device for shifting stages of a transmission, wherein a displaceable actuator for the manual selection of a shift stage (or driving mode) is provided, which can be adjusted into a plurality of positions. At least some or each of the positions can be assigned necessary conditions for the engagement of a shift stage assigned to the position. If the actuator is displaced into a position for which the conditions necessary for the same are not fulfilled, the associated shift stage is not engaged in the transmission and corresponding first signaling is carried out. Fulfillment of the necessary conditions of the associated shift stage following the displacement of the actuator into the position assigned to the shift stage or following the displacement in the direction of the associated position for the associated shift stage leads to the shift stage in the transmission being engaged.

8 Claims, 2 Drawing Sheets

(56) References Cited

U.S. PATENT DOCUMENTS

| | | | | |
|---|---|---|---|---|
| 7,200,477 | B2 * | 4/2007 | Burzio | F16H 61/24 |
| | | | | 701/52 |
| 7,347,118 | B2 * | 3/2008 | Maxon | F16H 61/16 |
| | | | | 701/62 |
| 7,639,239 | B2 * | 12/2009 | Kajimoto | G06F 3/011 |
| | | | | 345/173 |
| 8,413,533 | B2 | 4/2013 | Rake et al. | |
| 8,452,498 | B2 * | 5/2013 | Flanagan | F16H 61/24 |
| | | | | 200/61.88 |
| 8,485,059 | B2 * | 7/2013 | Peukert | F16H 59/02 |
| | | | | 74/473.12 |
| 9,188,223 | B1 * | 11/2015 | Seagraves | F16H 63/42 |

FOREIGN PATENT DOCUMENTS

| | | |
|---|---|---|
| DE | 10024920 A1 | 11/2001 |
| DE | 10212777 A1 | 10/2003 |
| DE | 102004008508 A1 | 9/2005 |
| EP | 2283254 A1 | 2/2011 |
| EP | 2394077 A1 | 12/2011 |

\* cited by examiner

ACTUATING DEVICE

CROSS-REFERENCE TO RELATED APPLICATION

This application claims priority to German Patent Application No. 102016117896.9, filed Sep. 22, 2016, the content of such application being incorporated by reference herein in its entirety.

FIELD OF THE INVENTION

The invention relates to an actuating device, in particular for shifting shift stages of a transmission or engaging a driving mode of a transmission of a motor vehicle. The invention also relates to a method for operating a transmission by using an actuating device.

BACKGROUND OF THE INVENTION

In motor vehicles, it is known that transmissions are operated by the driver of the motor vehicle by means of an actuating device. Thus, in a traditional shift gearbox, the gearbox transmission ratio can be selected by means of the selector lever, which is coupled mechanically to the gearbox. In the process, the driver senses mechanical forces from the gearbox, so that in the event of actuation into an inappropriate gearbox transmission ratio, he receives mechanical feedback to the effect that he had better not complete the intended shifting operation.

In automated or automatic transmissions, it is known that the engagement of a driving mode with the transmission selector lever is not always possible or is not always carried out. Here, it is usually questioned whether the conditions necessary for the engagement of the driving mode are fulfilled. Such conditions can be, for example, that the foot brake is actuated, the vehicle speed and/or the motor speed must comply with a defined condition, etc. If the necessary conditions are not present, then in some actuating devices the engagement of the driving mode by means of the transmission selector lever is blocked mechanically. In other actuating devices, the displacement of the transmission selector lever is possible but the corresponding engagement of the selected driving mode is not judged to be permissible and is not carried out. In this connection, the driver receives acoustic and/or optical feedback.

From EP 2 283 254 B1, which is incorporated by reference herein, it has been disclosed that in such a case, in which the conditions necessary for the engagement of a driving mode are not fulfilled, the driving mode is not engaged and vibrations of the transmission selector lever are activated, so that the driver is given feedback by the vibrations to the effect that the driving mode is not engaged, since the conditions necessary for the same are not all fulfilled. EP 2 394 077 B1, which is incorporated by reference herein, also discloses an actuating device which, by means of vibrations on the transmission selector lever, indicates that a selected driving mode is not permissible in the present operating situation.

Each of these has the disadvantage that the driver has to wait until the necessary conditions are present in order then to perform the actuation of the transmission selector lever again, so that the driving mode in the transmission which corresponds to the actuation of the transmission selector lever is then engaged. This is felt by some drivers to be inconvenient. The non-engagement of a driving mode when all the necessary conditions are not present is necessary, however, in order to protect the vehicle and the occupants.

SUMMARY OF THE INVENTION

An exemplary embodiment of the invention relates to an actuating device for shifting shift stages of a transmission or engaging a driving mode of a transmission of a motor vehicle, wherein a displaceable actuating means for the manual selection of a shift stage or driving mode is provided, which can be adjusted into a plurality of positions, wherein at least some or each of the positions can be assigned necessary conditions for the engagement of a shift stage or driving mode assigned to the position, wherein, if the actuating means is displaced into a position or in the direction of a position for which the conditions necessary for the same are not fulfilled, the associated shift stage or driving mode is not engaged in the transmission and corresponding first signaling is carried out, wherein the fulfillment of the necessary conditions of the associated shift stage or driving mode following the displacement of the actuating means into the position assigned to the shift stage or driving mode or following the displacement in the direction of the associated position for the associated shift stage or driving mode leads to the shift stage or driving mode in the transmission being engaged, that is to say engaged retrospectively. This means that the shift stage or driving mode then also counts as being engaged retrospectively. As a result, it is possible to preserve the safety aspect since, if the necessary conditions are not present, the desired shift stage or driving mode in the transmission is not engaged. In addition, a faster reaction is made possible, since the fulfillment of the necessary conditions is also still possible in retrospect and the desired shift stage or driving mode in the transmission can then be engaged directly and quickly.

Here, the term transmission is not restricted to a transmission of a motor vehicle with internal combustion engine but can also be a transmission of a motor vehicle with hybrid drive or with electric drive. A hybrid drive here is preferably a drive comprising internal combustion engine and electric motor. In such motor vehicles it is also possible for transmission ratios in the drive train to be shifted, which can be carried out by means of an appropriate transmission. Accordingly, by means of a transmission according to aspects of the invention, an electric motor or a hybrid drive can also be shifted when a transmission ratio or a transmission ratio stage is to be changed.

It is also advantageous if the signaling that the necessary conditions are not present and/or that an engagement of a shift stage or driving mode is not engaged is carried out by means of acoustic, optical and/or haptic signals. As a result, the driver is given a direct reaction to the current operating state and to the absence of the necessary conditions.

It is likewise expedient if fulfillment of the necessary conditions of the associated shift stage or driving mode following the displacement of the actuating means into the position assigned to the shift stage or driving mode or following the displacement in the direction of the associated position for the associated shift stage or driving mode leads to acoustic, optical and/or haptic second signaling being carried out. As a result, the driver is likewise notified of the fact that the necessary conditions are now present and the transmission has been brought into the desired operating situation, so that the driver is not surprised.

It is particularly advantageous if the haptic first signaling and the haptic second signaling are carried out by means of vibration of the actuating means.

Thus, it is also advantageous if a vibration actuator can act on the actuating means.

According to a further advantageous idea of the invention, it is particularly expedient if, when the actuating means is displaced into a position or in the direction of a position in relation to which the conditions necessary for the same are not fulfilled, the actuating device generates or outputs a signal which blocks engagement of the associated shift stage or driving mode. As a result, the transmission can be instructed not to carry out the desired processes which otherwise should be initiated by the actuation of the actuating means.

It is also particularly advantageous if, when the actuating means is displaced into a position or in the direction of a position in relation to which the necessary conditions of the associated shift stage or driving mode are only fulfilled following the displacement of the actuating means into the position assigned to the shift stage or driving mode or following the displacement in the direction of the associated position for the associated shift stage or driving mode, the actuating device generates or outputs a signal which permits or initiates the engagement of the associated shift stage or driving mode. As a result, the transmission can be instructed to carry out the desired processes which were previously blocked.

An exemplary embodiment of the invention relates to a method for operating a transmission having an actuating device, in particular having an actuating device according to one of the preceding claims, for shifting shift stages of a transmission or for engaging a driving mode of a transmission of a motor vehicle, wherein a displaceable actuating means for the manual selection of a shift stage or driving mode is provided, which can be adjusted into a plurality of positions, wherein at least some or each of the positions can be assigned necessary conditions for the engagement of a shift stage or driving mode assigned to the position, wherein, if the actuating means is displaced into a position or in the direction of a position for which the conditions necessary for the same are not fulfilled, the associated shift stage or driving mode is not engaged in the transmission and corresponding first signaling is carried out, wherein fulfillment of the necessary conditions of the associated shift stage or driving mode following the displacement of the actuating means into the position assigned to the shift stage or driving mode or following the displacement in the direction of the associated position for the associated shift stage or driving mode leads to the shift stage or driving mode in the transmission being engaged.

It is also particularly advantageous if, when the actuating means is displaced into a position or in the direction of a position in relation to which the conditions necessary for the same are not fulfilled, the actuating device generates or outputs a signal which blocks engagement of the associated shift stage or driving mode in the transmission.

It is likewise advantageous if, when the actuating means is displaced into a position or in the direction of a position in relation to which the necessary conditions of the associated shift stage or driving mode are only fulfilled following the displacement of the actuating means into the position assigned to the shift stage or driving mode or following the displacement in the direction of the associated position for the associated shift stage or driving mode, the actuating device generates or outputs a signal which permits or initiates the engagement of the associated shift stage or driving mode in the transmission.

BRIEF DESCRIPTION OF THE DRAWING

The invention will be explained below in more detail by using an exemplary embodiment and with reference to the drawing, in which.

DETAILED DESCRIPTION OF THE INVENTION

Figure 1:
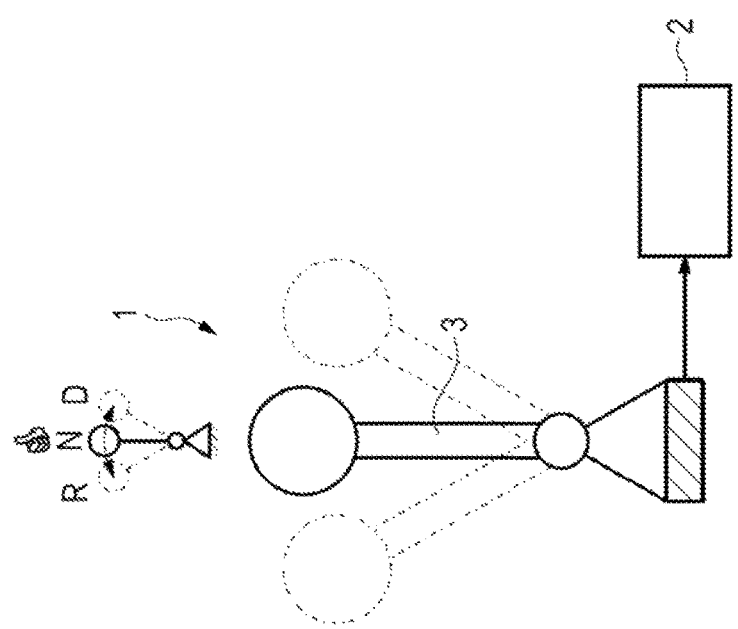
FIG. 1 shows an illustration actuating device in a first operating situation.

FIG. 1 shows an actuating device 1 for shifting shift stages of a transmission 2 or for engaging a driving mode of a transmission 2 of a motor vehicle.

The actuating device has a displaceable actuating means 3 (e.g., gear shift, shift lever or paddle) for the manual selection of a shift stage or driving mode, which can be adjusted into a plurality of positions, for example into the positions R, N, D shown. Here, the position R represents the reverse gear, the position N the transmission neutral position and the position D the driving position (Drive).

In order to set or engage a shift stage or a driving mode in the transmission 2, in at least some or in all of the positions there exist necessary conditions for the engagement of a shift stage or driving mode assigned to the position, so that safety aspects are taken into account. Often, for example, a brake actuation out of the position N to the position D or R is necessary. If the necessary conditions are not fulfilled, although the actuating means 3 can be moved into the corresponding position or moved toward the intended position, the transmission 2 is not driven accordingly, it is therefore blocked and the intended shift stage or the intended driving mode is not engaged.

An actuation from the position N to the position R or D is permissible according to FIG. 1, since the necessary conditions are fulfilled, that is to say for example that the foot brake is actuated and possibly further necessary conditions are fulfilled.

Figure 2:
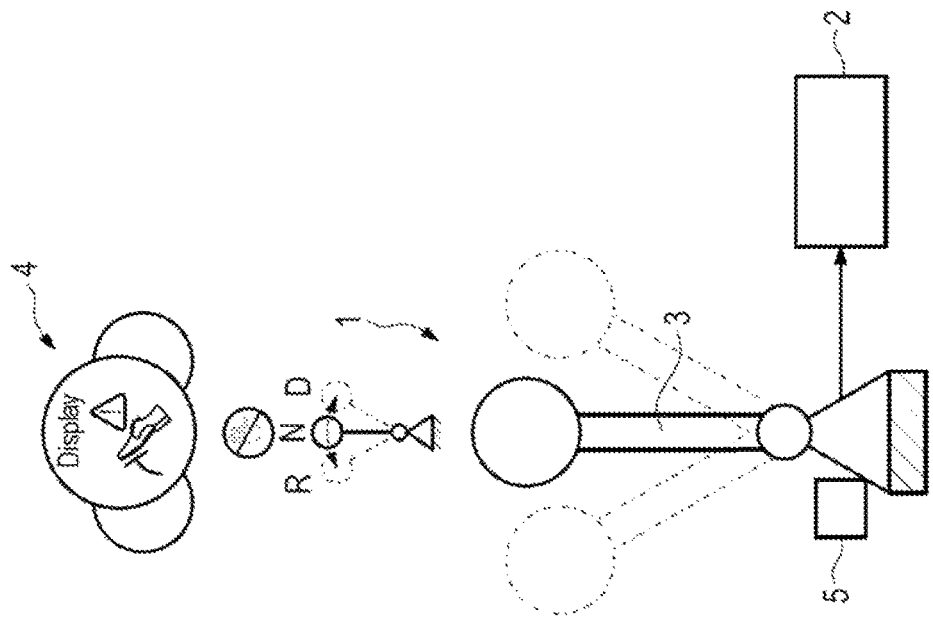
FIG. 2 shows an illustration of an actuating device in a second operating situation.

An actuation from the position N to the position R or D is not permissible according to FIG. 2, since the necessary conditions are not fulfilled. For example, the foot brake is not actuated here. Therefore, at least one optical signaling 4 is provided to the effect that the foot brake is not actuated.

If the actuating means 3 is displaced into a position or in the direction of a position, that is to say for example R, D, N, in relation to which the conditions necessary for the same are not fulfilled, the associated shift stage or driving mode in the transmission 2 is not engaged. A corresponding first signaling 4 is given, which indicates this.

If the necessary conditions of the associated shift stage or driving mode have been fulfilled only following the displacement of the actuating means 3 into the position assigned to the shift stage or driving mode or following the displacement in the direction of the associated position for the associated shift stage or driving mode without the necessary conditions already having been fulfilled, this leads to the shift stage or driving mode in the transmission 2 only then being engaged.

This can also be described in that, the absence of the necessary conditions, the engagement of the respective shift stage or driving mode is not carried out or is blocked. If the necessary conditions are fulfilled later and if the actuating means 3 is still in the associated position, the engagement of the respective shift stage or driving mode is then carried out without the actuating means 3 having to be moved out of the associated position again and then moved in again.

The signaling 4 that necessary conditions are not present and/or that engagement of a shift stage or driving mode is not engaged is carried out by acoustic, optical and/or haptic signals. FIG. 2 shows optical signals. A vibration actuator 5 can also be fitted to the actuating means 3 or otherwise, leading to vibrations of the actuating means 3, which is perceptible by the driver.

For safety reasons, fulfillment of the necessary conditions of the associated shift stage or driving mode following the displacement of the actuating means 3 into the position (N, D, R, . . . ) assigned to the shift stage or driving mode or following the displacement in the direction of the associated position (N, D, R, . . . ) for the associated shift stage or driving mode can lead to acoustic, optical and/or haptic second signaling 4 being carried out. This can also be carried out by means of vibration, by means of a display and/or by means of a signal tone.

It is particularly clear for the driver if the haptic first signaling 4 and/or the haptic second signaling 4 is/are carried out by means of vibration of the actuating means 3. The first signaling 4 can be carried out here with the same vibration frequency and/or vibration amplitude as the second signaling 4 or the first signaling 4 can be carried out with a different vibration frequency and/or vibration amplitude than the second signaling 4.

In relation to driving the transmission 2, when the actuating means 3 is displaced into a position or in the direction of a position in relation to which the conditions necessary for the same are not fulfilled, the actuating device 1 can generate or output a signal which blocks the engagement of the associated shift stage or driving mode. The actuating device 1 comprises here a control unit, which generates and passes on the signal, in order that the transmission 2 is not adjusted into the corresponding shift stage or driving mode.

Provision can also be made that, when the actuating means 3 is displaced into a position or in the direction of a position in relation to which the necessary conditions of the associated shift stage or driving mode are fulfilled only following the displacement of the actuating means 3 into the position assigned to the shift stage or driving mode or following the displacement in the direction of the associated position for the associated shift stage or driving mode, the actuating device 1 generates or outputs a signal which permits or initiates the engagement of the associated shift stage or driving mode. Then, in the event of retrospective fulfillment of the necessary conditions, the transmission 2 is driven to set the corresponding assigned shift stage or driving mode.

Figure 3:
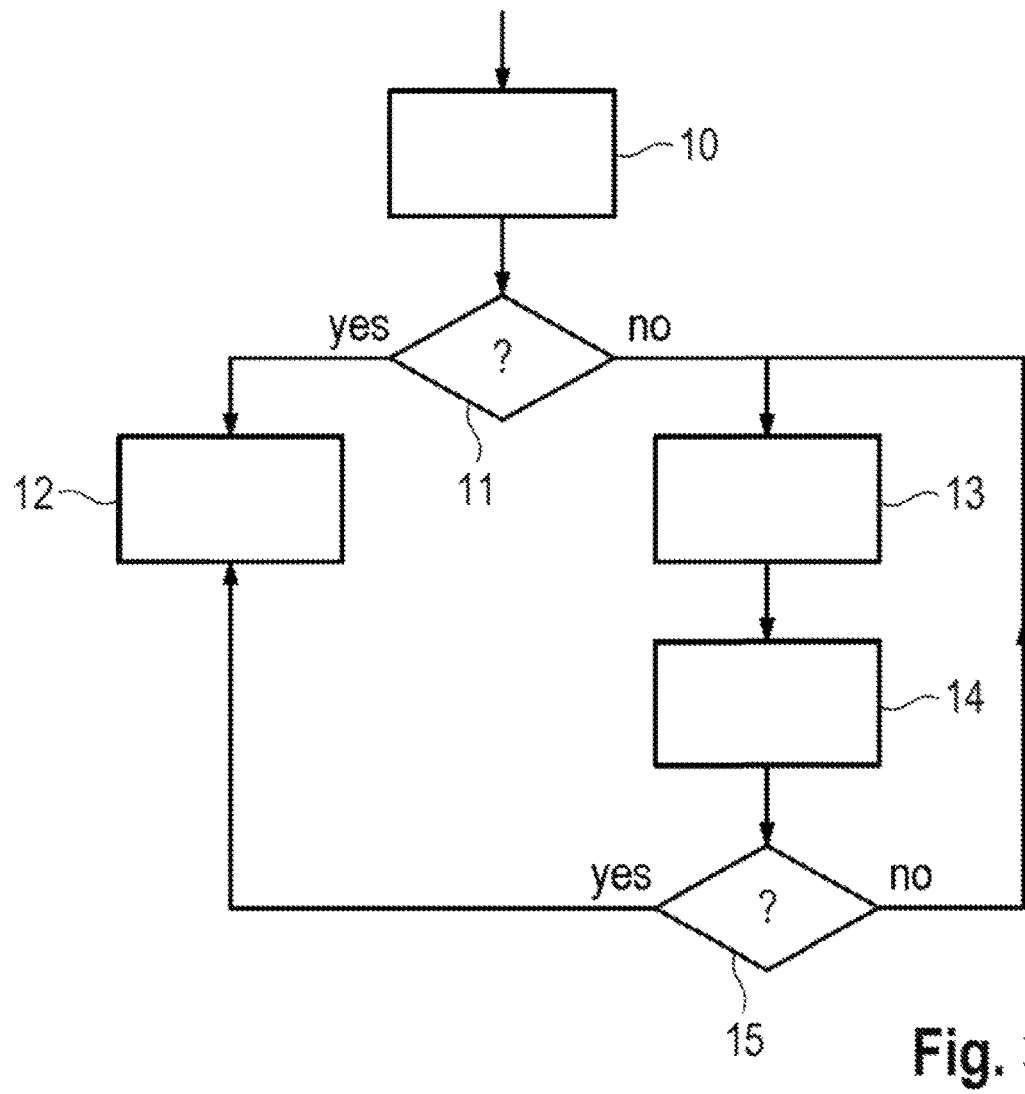
FIG. 3 shows a diagram to explain the method according to aspects of the invention.

FIG. 3 shows a block diagram in which the method according aspects of the invention is explained by way of example.

The method for operating a transmission 2 by using an actuating device 1 provides for the actuating device 1 to be provided for shifting shift stages of a transmission 2 or for engaging a driving mode of a transmission 2 of a motor vehicle. A displaceable actuating means 3 is provided here for the manual selection of a shift stage or driving mode, which can be adjusted into a plurality of positions. Also, at least one individual position or a plurality or each of the positions is assigned at least one necessary condition for engaging a shift stage or driving mode in the transmission 2 assigned to the position.

In block 10, displacement of the actuating means 3 is detected. In block 11, the question is asked whether the conditions necessary for the displacement and the associated position are fulfilled. If the necessary conditions are fulfilled, then in block 12 the associated shift stage or driving mode in the transmission 2 is engaged.

If the necessary conditions are not fulfilled in block 11, then in block 13 the associated shift stage or driving mode in the transmission 2 is not engaged. A first signaling 4 of the operating state is carried out.

If the necessary conditions for the actuation of the actuating means 3 that has been carried out are subsequently satisfied in block 14, then the question is asked in block 15 as to whether the actuating means 3 is still in the associated position. If this is the case, then in block 12 the associated shift stage or driving mode in the transmission 2 is engaged. If this is no longer the case, then in block 13 the associated shift stage or driving mode in the transmission 2 is not engaged.

LIST OF DESIGNATIONS

1 Actuating means
2 Transmission
3 Actuating means
4 Signaling
5 Vibration actuator
10 Block
11 Block
12 Block
13 Block
14 Block
15 Block

What is claimed is:

1. An actuating device for shifting shift stages of a transmission or engaging a driving mode of a transmission of a motor vehicle, wherein a displaceable actuating means for the manual selection of a shift stage or driving mode is provided, which can be adjusted into a plurality of positions, wherein at least some or each of the positions are assigned necessary conditions for the engagement of the shift stage or driving mode assigned to the position, wherein, when the actuating means is displaced into a position or in the direction of a position for which the conditions necessary for the same are not fulfilled, the associated shift stage or driving mode is not engaged in the transmission and a corresponding first signaling is carried out, wherein the fulfillment of the necessary conditions of the associated shift stage or driving mode following the displacement of the actuating means into the position assigned to the shift stage or driving mode or following the displacement in the direction of the associated position for the associated shift stage or driving mode leads to the shift stage or driving mode in the transmission being engaged, wherein the signaling that the necessary conditions are not present or that an engagement of a shift stage or driving mode is not engaged is carried out by a first signaling including one or more of acoustic, optical and haptic signals, and wherein fulfillment of the necessary conditions of the associated shift stage or driving mode following the displacement of the actuating means into the position assigned to the shift stage or driving mode or following the displacement in the direction of the associated position for the associated shift stage or driving mode leads to a second signaling including one or more of acoustic, optical and haptic signals being carried out.

2. The actuating device as claimed in claim 1, wherein the haptic first signaling and the haptic second signaling are carried out by vibration of the actuating means.

3. The actuating device as claimed in claim 2, further comprising a vibration actuator that is configured to act on the actuating means.

4. The actuating device as claimed in claim 1, wherein when the actuating means is displaced into the position or in the direction of the position in relation to which the conditions necessary for the same are not fulfilled, the actuating device generates or outputs a signal which blocks engagement of the associated shift stage or driving mode.

5. The actuating device as claimed in claim 1, wherein when the actuating means is displaced into the position or in the direction of the position in relation to which the necessary conditions of the associated shift stage or driving mode are only fulfilled following the displacement of the actuating means into the position assigned to the shift stage or driving mode or following the displacement in the direction of the associated position for the associated shift stage or driving mode, the actuating device generates or outputs a signal which permits or initiates the engagement of the associated shift stage or driving mode.

6. A method for operating a transmission having an actuating device for shifting shift stages of a transmission or for engaging a driving mode of a transmission of a motor vehicle, and a displaceable actuating means for manual selection of a shift stage or driving mode and which can be adjusted into a plurality of positions, wherein at least some or each of the positions can be assigned necessary conditions for the engagement of the shift stage or driving mode assigned to the position, wherein the method comprises:

when the actuating means is displaced into a position or in the direction of a position for which the conditions necessary for the same are not fulfilled, (i) the associated shift stage or driving mode is not engaged in the transmission, and (ii) corresponding first signaling including one or more of acoustic, optical and haptic signals is carried out, and fulfillment of the necessary conditions of the associated shift stage or driving mode following the displacement of the actuating means into the position assigned to the shift stage or driving mode or following the displacement in the direction of the associated position for the associated shift stage or driving mode leads to (i) the shift stage or driving mode in the transmission being engaged, and (ii) a second signaling including one or more of acoustic, optical and haptic signals being carried out.

7. The method as claimed in claim 6, wherein when the actuating means is displaced into the position or in the direction of the position in relation to which the conditions necessary for the same are not fulfilled, the actuating device generates or outputs a signal which blocks engagement of the associated shift stage or driving mode in the transmission.

8. The method as claimed in claim 6, wherein when the actuating means is displaced into the position or in the direction of the position in relation to which the necessary conditions of the associated shift stage or driving mode are only fulfilled following the displacement of the actuating means into the position assigned to the shift stage or driving mode or following the displacement in the direction of the associated position for the associated shift stage or driving mode, the actuating device generates or outputs a signal which permits or initiates the engagement of the associated shift stage or driving mode in the transmission.

* * * * *